(12) United States Patent
Chawda et al.

(10) Patent No.: US 10,485,064 B2
(45) Date of Patent: Nov. 19, 2019

(54) DEVICES, METHODS, AND SYSTEMS FOR ALTERNATING CURRENT CIRCUITS FOR AIRFIELD LIGHTING

(71) Applicant: Honeywell International Inc., Morris Plains, NJ (US)

(72) Inventors: Nipun Kumar Chawda, Bangalore (IN); Hans-Willy Schuett, Brande-Hoernerkirchen (DE); Reiner Wiechert, Uetersen (DE)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/352,491

(22) Filed: Mar. 13, 2019

(65) Prior Publication Data

US 2019/0215922 A1    Jul. 11, 2019

Related U.S. Application Data

(63) Continuation of application No. 15/905,453, filed on Feb. 26, 2018, now Pat. No. 10,244,594.

(Continued)

(51) Int. Cl.
*H05B 37/02* (2006.01)
*B64F 1/12* (2006.01)
(Continued)

(52) U.S. Cl.
CPC ........... *H05B 33/0815* (2013.01); *B64F 1/20* (2013.01); *H05B 33/089* (2013.01);
(Continued)

(58) Field of Classification Search
CPC .............. H05B 37/0263; H05B 37/038; H05B 33/0818; H05B 37/036; H05B 33/0815;
(Continued)

(56) References Cited

U.S. PATENT DOCUMENTS

| 4,912,372 A | * | 3/1990 | Mongoven | ........... H05B 37/036 |
| | | | | 307/17 |
| 5,034,659 A | * | 7/1991 | Taniguchi | ............ H05B 37/038 |
| | | | | 315/130 |

(Continued)

FOREIGN PATENT DOCUMENTS

| EP | 2348795 A2 | 7/2011 |
| EP | 2579690 A2 | 4/2013 |

(Continued)

OTHER PUBLICATIONS

The Extended Search Report from related European Application No. 18152876.1 dated Jun. 27, 2018 (10 pages).

*Primary Examiner* — Vibol Tan
(74) *Attorney, Agent, or Firm* — Brooks, Cameron & Huebsch, PLLC

(57) ABSTRACT

Devices, methods, and systems for alternating current circuits for airfield lighting are described herein. One system includes a circuit comprising an isolation transformer, a protection hardware circuit coupled to the isolation transformer, wherein the protection hardware prevents a voltage between an electrical contact of the circuit and a ground contact from meeting or exceeding a threshold voltage, and a load coupled to the protection hardware circuit to receive electrical energy from the isolation transformer.

18 Claims, 5 Drawing Sheets

Related U.S. Application Data

(60) Provisional application No. 62/463,905, filed on Feb. 27, 2017.

(51) Int. Cl.
  *H05B 33/08* (2006.01)
  *B64F 1/20* (2006.01)
  *H05B 37/03* (2006.01)

(52) U.S. Cl.
  CPC ..... *H05B 33/0887* (2013.01); *H05B 37/0263* (2013.01); *H05B 37/036* (2013.01); *H05B 37/038* (2013.01)

(58) Field of Classification Search
  CPC .. H05B 33/0884; H05B 33/089; H05B 37/00; H05B 37/02; H05B 37/0254; F21S 8/086; G08G 5/0026; H02H 1/04; H02H 7/04; H02H 9/045; Y02B 20/72; B64D 2203/00
  See application file for complete search history.

(56) References Cited

U.S. PATENT DOCUMENTS

| | | | |
|---|---|---|---|
| 5,359,325 A | 10/1994 | Ford et al. | |
| 5,485,151 A | 1/1996 | Runyon et al. | |
| 5,625,260 A * | 4/1997 | Millgard | H02J 13/0089 315/130 |
| 5,926,115 A * | 7/1999 | Schleder | H05B 37/038 315/130 |
| 5,955,843 A | 9/1999 | Nuckolls et al. | |
| 9,131,584 B2 * | 9/2015 | Yu | H05B 33/089 |
| 9,554,444 B2 * | 1/2017 | Macbean | H05B 37/00 |
| 9,894,727 B2 | 2/2018 | Wee et al. | |
| 9,938,115 B2 | 4/2018 | Gewinner et al. | |
| 9,942,964 B2 | 4/2018 | Chawda et al. | |
| 2005/0190078 A1 * | 9/2005 | Salter | H05B 37/0254 340/945 |
| 2008/0001782 A1 | 1/2008 | That | |
| 2008/0129309 A1 * | 6/2008 | Cannistra | H05B 37/03 324/527 |
| 2008/0272937 A1 * | 11/2008 | That | H05B 33/0809 340/947 |
| 2010/0283400 A1 | 11/2010 | Catoul et al. | |
| 2011/0031896 A1 * | 2/2011 | Vandevoorde | H05B 37/0245 315/294 |
| 2017/0149325 A1 | 5/2017 | Lau et al. | |

FOREIGN PATENT DOCUMENTS

| | | |
|---|---|---|
| JP | H11111472 A | 4/1999 |
| KR | 20100080676 A | 7/2010 |
| WO | 2016141558 A1 | 9/2016 |

* cited by examiner

DEVICES, METHODS, AND SYSTEMS FOR ALTERNATING CURRENT CIRCUITS FOR AIRFIELD LIGHTING

PRIORITY INFORMATION

This application is a Continuation of U.S. application Ser. No. 15/905,453, filed Feb. 26, 2018, which a Non-Provisional of U.S. Provisional Application No. 62/463,905, filed Feb. 27, 2017, the contents of which are incorporated herein by reference.

TECHNICAL FIELD

The present disclosure relates to devices, methods, and systems for alternating current circuits for airfield lighting.

BACKGROUND

A cable fault can be caused by an insulation breakdown. The failure modes of such a cable fault can include a short circuit to ground and/or a "soft fault" with a relatively low electrical impedance (or resistance), comparing to that of the cable insulation, between the cable and the earth ground.

For example, in the case of the airfield lighting system, where each lighting segment may contain an array of 250 or more runway light assemblies coupled in series by a power cable buried in the runway which runs as much as 15 Kilometers or more, a power cable fault can lead to a large number of runway lights to go off, resulting in safety hazard and potentially part of the airport runways being shut down. In some examples, a fault or damaged runway light assembly can require a user to replace the runway light or other components of the runway light assembly.

As can be seen, there is a need for an effective safety mechanism to protect a user replacing a runway light or other components of the runway light assembly. For example, a faulty open lamp can cause the voltage of the runway light assembly to a dangerous level to the user.

DETAILED DESCRIPTION

Figure 1:
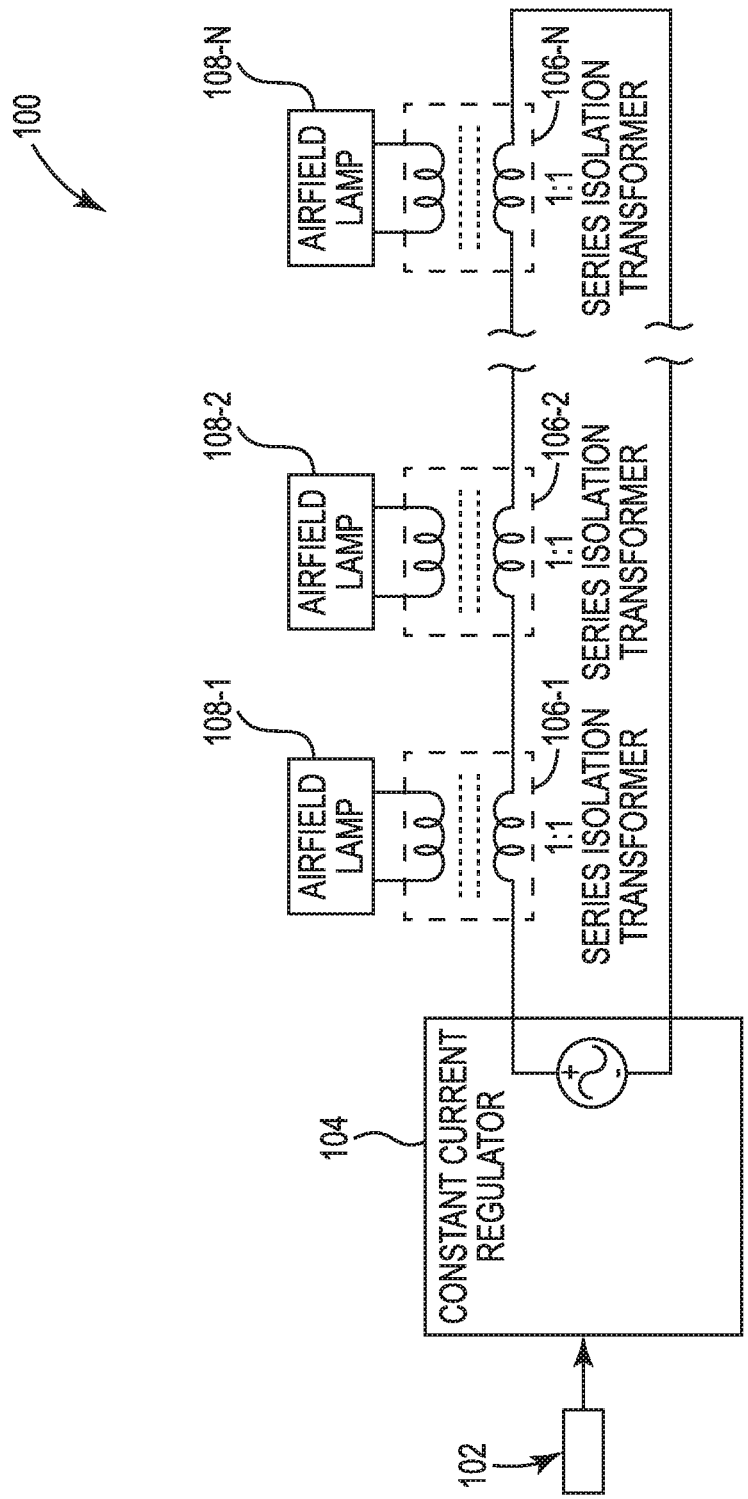
FIG. 1 is an example of an airfield lighting system according to one or more embodiments of the present disclosure.

Devices, methods, and systems for alternating current circuits for airfield lighting are described herein. One system includes a circuit comprising an isolation transformer, a protection hardware circuit coupled to the isolation transformer, wherein the protection hardware prevents a voltage between an electrical contact of the circuit and a ground contact from meeting or exceeding a threshold voltage, and a load coupled to the protection hardware circuit to receive electrical energy from the isolation transformer.

The devices, methods, and systems described herein can utilize protection hardware positioned between an isolation transformer and a load to protect a user when the load is removed from a circuit. For example, the voltage at the point of the load when the load is removed can spike to a level that is unsafe for a user. In this example, the protection hardware can maintain a voltage level between the isolation transformer and the load such that even when the load is removed, the voltage does not spike to an unsafe level for a user performing maintenance on the circuit.

The protection hardware can include a safety extra low voltage (SELV) and/or a protective extra low voltage (PELV) protection hardware. As used herein, the SELV and/or PELV protection hardware can be utilized to prevent a voltage from exceeding an extra-low voltage (ELV) level. As used herein, the ELV can include a voltage range that is recognized as having a low risk of dangerous electrical shock by the International Electrotechnical Commission.

The devices, methods, and systems described herein can utilize the protection hardware between an isolation transformer and a load to allow a user to replace an airfield light of an airfield lighting circuit without having to disable the airfield lighting circuit. For example, a user can remove a broken airfield light and replace the broken airfield light when the airfield lighting circuit is live (e.g., when the power source is on and supplying power to the airfield lighting circuit, etc.). This can be beneficial since deactivating the airfield lighting circuit to perform maintenance on a load of the airfield lighting circuit can delay operations of the airfield.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

FIG. 1 is an example of an airfield lighting system 100 according to one or more embodiments of the present disclosure. The airfield lighting system 100 can be a previous airfield lighting system that does not include the protection hardware described herein. That is, a voltage spike can occur at the loads or airfield lamps 108-1, 108-2, 108-N when the loads or airfield lamps 108-1, 108-2, 108-N are removed from the airfield lighting system 100. As described herein, the voltage spike can be dangerous to a user working on the airfield lighting system 100.

The airfield lighting system 100 can include a power source 102. The power source 102 can be a high voltage alternating current power source. As used herein, high voltage alternating current power source can include a power source that provides alternating current (AC) power between 220 kilovolts (kV) and 415 kV. In some examples, the power source 102 can be coupled to a constant current regulator (CCR) 104. As used herein, a CCR 104 includes a source regulator that maintains a constant current for a load coupled to the CCR 104, which can provide AC power up to 5 kV or more. In some examples, the CCR 104 can prevent current spikes throughout the airfield lighting system 100. For example, the airfield lighting system 100 can include a plurality of airfield lamps 108-1, 108-2, 108-N that can operate within a particular amperage range. In this example, a spike in current or amperage can cause damage to one or more of the plurality of airfield lamps 108-1, 108-2, 108-N. Thus, in this example, the CCR 104 can prevent the current of the airfield lighting system 100 from exceeding the particular amperage range designated for the plurality of airfield lamps 108-1, 108-2, 108-N.

The airfield lighting system 100 can include a plurality of isolation transformers 106-1, 106-2, 106-N coupled to the CCR 104. In some examples, the plurality of isolation transformers 106-1, 106-2, 106-N can be coupled in series with the CCR 104. As used herein, a series circuit or series connection can include an electrical connection where each device of the circuit is coupled along a single pathway. For example, the isolation transformer 106-1 includes an input that is coupled to an output of the CCR 104 and an output that is coupled to an input of the isolation transformer 106-2. In this example, there is a single pathway between the output of the CCR 104 and the input of the isolation transformer 106-2.

As used herein, an isolation transformer can include a transformer to transfer electrical power from a power source such as power source 104 and/or the CCR 104 to a load such as the airfield lamps 108-1, 108-2, 108-N while isolating the load from the power source. In some examples, isolating the load from the power source can include creating a galvanic isolation between the load and the power source. As used herein, a galvanic isolation includes isolating functional sections of an electrical system to prevent current flow while allowing energy or information to be exchanged between the isolated functional sections.

The airfield lighting system 100 can include an airfield lamp 108-1, 108-2, 108-N or other type of load coupled to each of the isolation transformers 106-1, 106-2, 106-N. For example, the airfield lamp 108-1 can be coupled the isolation transformer 106-1. In this example, the isolation transformer 106-1 can transform electrical power through electromagnetic induction from the power source 102 to the airfield lamp 108-1. As described herein, the isolation transformer 106-1 can also isolate the airfield lamp 108-1 from the other airfield lamps 108-2, 108-N.

As described herein, the airfield lighting system 100 can be a previous airfield lighting system that does not include the protection hardware described herein. That is, a voltage spike can occur at the loads or airfield lamps 108-1, 108-2, 108-N when the loads or airfield lamps 108-1, 108-2, 108-N are removed from the airfield lighting system 100. Thus, previous airfield lighting systems can allow voltage spikes that can be dangerous to a user working on the airfield lighting system.

Figure 2:
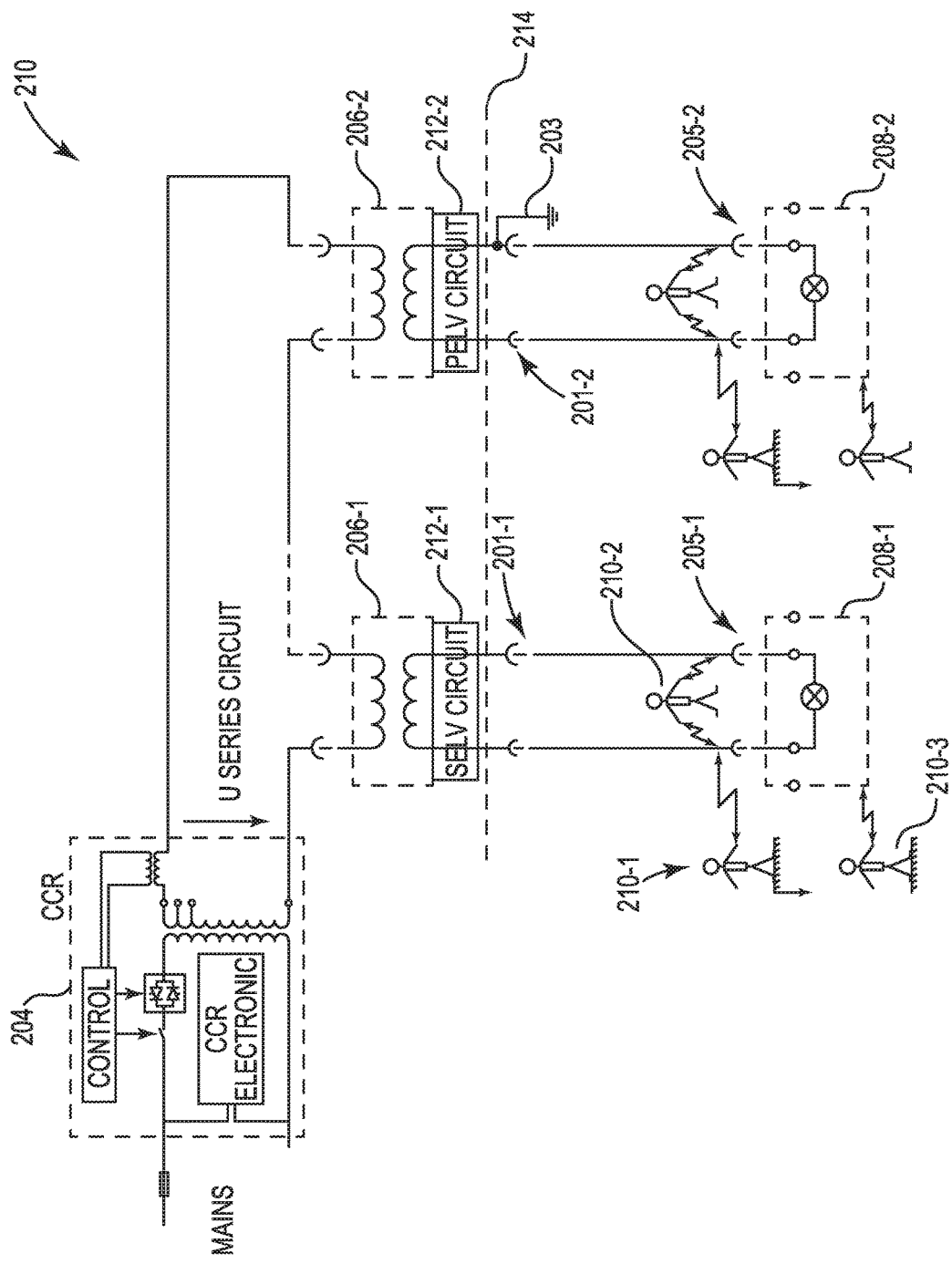
FIG. 2 is an example of a system alternating current circuits for airfield lighting according to one or more embodiments of the present disclosure.

FIG. 2 is an example of a system 210 alternating current circuits for airfield lighting according to one or more embodiments of the present disclosure. In some examples, the system 210 can include the same or similar elements as system 100 as referenced in FIG. 1. For example, the system 210 can include a constant current regulator (CCR) 204, a plurality of isolation transformers 206-1, 206-2 coupled to the CCR 204 in series, and a plurality of airfield lamps 208-1, 208-2 coupled to the plurality of isolation transformers 206-1, 206-2. In some examples, the isolation transformer 206-1 and protection hardware 212-1 can be positioned within an enclosure. In some examples, the enclosure can be configured to protect a connection between the isolation transformer 206-1 and the protection hardware 212-1.

The system 210 can provide additional protection over the system 100 as referenced in FIG. 1. For example, the system 210 can include protection hardware 212-1, 212-2. As used herein, protection hardware 212-1, 212-2 can include a safety extra low voltage (SELV) protection hardware and/or a protective extra low voltage (PELV) protection hardware. The protection hardware 212-1, 212-2 can be positioned between the isolation transformer 206-1, 206-2 and a corresponding load or airfield lamp 208-1, 208-2.

In some examples, the system 210 can include an alternating current protection device, comprising, an enclosure including an input electrically coupled to an airfield lighting circuit that includes an electrical power source (e.g., CCR 204, etc.), wherein the enclosure further includes: an isolation transformer 206-1, 206-2 to receive electrical energy via the input from the electrical power source, and a protection hardware 212-1, 212-2 coupled between the isolation transformer 206-1, 206-2 and a load 208-1, 208-2 to receive electrical power from the electrical power source, wherein the protection hardware 212-1, 212-2 is configured to prevent a voltage between an electrical contact of the airfield lighting circuit and a ground contact 203 from meeting or exceeding a threshold voltage.

In some examples, the system 210 can include a source regulator (e.g., CCR 204, etc.) coupled to an electrical power source, a plurality of isolation transformers 206-1, 206-2 coupled in series with the source regulator, a plurality of protection hardware devices 212-1, 212-2 coupled to each of the plurality of isolation transformers 206-1, 206-2, and a plurality of airfield lamps 208-1, 208-2 coupled to each of the plurality of protection hardware devices 212-1, 212-2. In some examples, the system 210 can include a plurality of protection hardware devices 212-1, 212-2 that each include a power supply coupled to a load sensor, a relay coil coupled to the load sensor, and/or a double pole double throw (DPDT) relay coupled to the load sensor. In some examples, a plurality of airfield lamps 208-1, 208-2 can be coupled to a corresponding DPDT relay of a corresponding protection hardware device 212-1, 212-2 of the plurality of protection hardware devices 212-1, 212-2. In some examples, the DPDT relay can be a triple pole double throw (3; PDT) relay. A 3PDT relay is similar to a DPDT relay, but a 3PDT relay can utilize three poles instead of two poles. Even though discussions herein utilize a DPDT designation, a 3PDT or 4PDT can be utilized to replace the DPDT described herein.

As used herein, the SELV protection hardware includes circuit that includes an electrical protective separation (e.g., double insulation, reinforced insulation, protective screening, etc.) from other circuits other than the SELV protection hardware. In addition, the SELV protection hardware can include protective separation from other SELV or PELV protection hardware. As used herein, the PELV protection hardware includes a circuit that includes the same or similar elements as the SELV protection hardware, but the PELV protection hardware can include a protective earth ground 203 connection. As used herein, a protective earth ground 203 connection can include connecting a specific part of a circuit with the Earth's conductive surface.

As described herein, the protection hardware 212-1, 212-2 can provide a safety border line 214 or safety area between the protection hardware 212-1, 212-2 and a load or load system (e.g., airfield lamp 208-1, airfield lamp 208-2, etc.). In some examples, the safety border line 214 can be positioned at a connection 201-1, 201-2 of a system utilized to operate the airfield lamps 208-1, 208-2. For example, a system utilized to operate the airfield lamp 208-1 can include a connection 201-1 to electrically coupled to the airfield lamp 208-1 to the protection hardware 212-1. In this example, the safety border line 214 can be positioned between the protection hardware 212-1 and the connection 201-1.

In some examples, the protection hardware 212-1, 212-2 can be utilized to provide protection for a system utilized to operate the airfield lamps 208-1, 208-2. In some examples, the system to operate the airfield lamps 208-1, 208-2 can include a connection 201-1, 201-2 that is coupled to a connection of the protection hardware 212-1, 212-2 and a connection 205-1, 205-2 that is coupled to a connection of the airfield lamps 208-1, 208-2. In these examples, the protection hardware 212-1, 212-2 can protect a user 210-1, 210-2, 210-3 from a voltage that exceeds a threshold voltage (e.g., voltage above an ELV as described herein, etc.) at a plurality of different points of the system to operate the airfield lamps 208-1, 208-2.

As described herein, the protection hardware 212-1, 212-2 can protect the system to operate the airfield lamps 208-1, 208-2 from voltage spikes. For example, a user 210-1 can interact with one of the two lines between the connection 201-1 and the connection 205-1 while being protected from voltages above a threshold voltage by the protection hardware 212-1. In another example, a user 210-2 can interact with both of the two lines between the connection 201-1 and the connection 205-1 while being protected from voltages above a threshold voltage by the protection hardware 212-1. In an additional example, a user 210-3 can interact with a housing or connection of the airfield lamp 208-1 while being protected from voltages above a threshold voltage by the protection hardware 212-1.

In the previous examples, the user 210-1, 210-2, 210-3 can be protected by the protection hardware 212-1 when: the airfield lamp 208-1 is installed and operating, the airfield lamp 208-1 is installed and not functional, or when the airfield lamp 208-1 is removed from the housing or connection of the airfield lamp 208-1. In this way, the airfield lamp 208-1 can be a hot swappable airfield lamp that will not endanger a user 210-1, 210-2, 210-3 working within the safety border line 214 even when the airfield lamp 208-1 is removed. Previous systems that do not include the protection hardware 212-1, 212-2 could be provide safe voltages for a user 210-1, 210-2, 210-3 when the airfield lamp 208-1 is installed, but would generate voltage spikes as described herein when the airfield lamp 208-1 was removed from the circuit.

Figure 3:
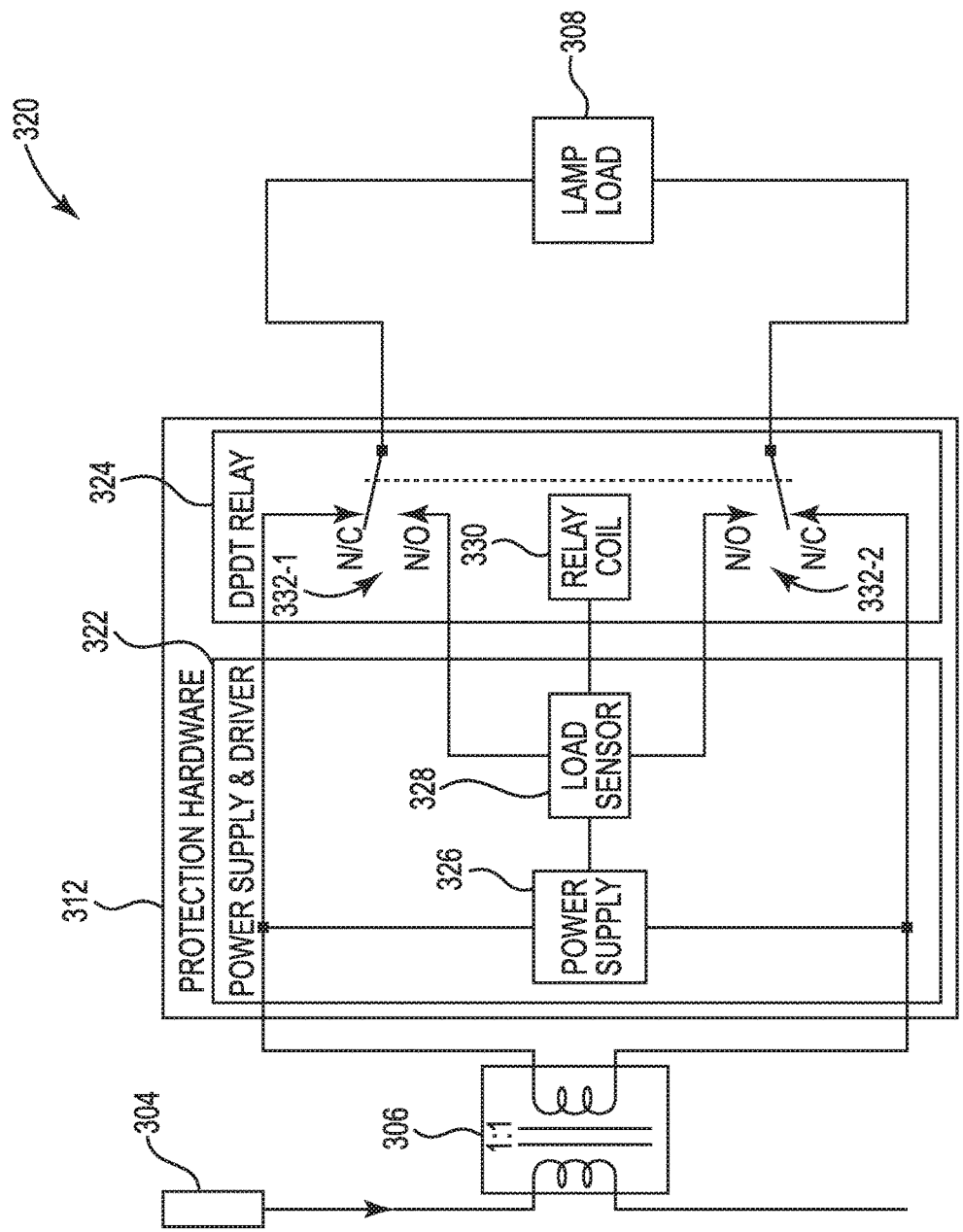
FIG. 3 is an example of a system for alternating current circuits for airfield lighting according to one or more embodiments of the present disclosure.

FIG. 3 is an example of a system 320 for alternating current circuits for airfield lighting according to one or more embodiments of the present disclosure. In some examples, the system 320 can be a part of a system 210 as referenced in FIG. 2. For example, the system 320 can include a CCR 304 coupled to an isolation transformer 306. In this example, the CCR 304 and the isolation transformer 306 can be similar to the CCR 204 and/or isolation transformer 206 as referenced in FIG. 2. In some examples, the isolation transformer 306 can be coupled to other isolation transformers in series.

In some examples, the system 320 can include a lamp load 308. For example, the lamp load 308 can be an airfield light receiving electrical power from a power source coupled to the CCR 304 and/or the isolation transformer 306. In some examples, the lamp load 308 can be a hot-swappable airfield light. As used herein, a hot-swappable airfield light includes a lighting device that can be coupled to and decoupled from a housing while the system 320 has live power (e.g., power is provided to the isolation transformer 306 and power is provided to the lamp load 308, etc.).

The system 320 can include protection hardware 312 positioned between the isolation transformer 306 and the lamp load 308. As described herein, the protection hardware 312 can be a SELV protection hardware and/or a PELV protection hardware. In some examples, the protection hardware 312 can include a power supply/driver 322 and a double pole double throw (DPDT) relay 324. As described herein, the isolation transformer 306 can be utilized to isolate the protection hardware 312 and/or the lamp load 308 from other electrical devices coupled to the airfield lighting circuit. In some examples, the isolation transformer 306 can also isolate the protection hardware while allowing additional power sources (e.g., power supply 326, etc.) to provide electrical power to the protection hardware 312 or lamp load 308.

The power supply 326 can be coupled to the isolation transformer 306. In some examples, the power supply 326 can convert electrical power from the isolation transformer 306 to electrical power suitable for a load sensor 328. For example, the power supply 326 can receive power from the isolation transformer 306 that includes a particular voltage, current, and/or frequency. In this example, the power supply 326 can alter the voltage, current, and/or frequency of the received power to a particular voltage, current, and/or frequency for the load sensor 328. That is, the protection hardware circuit 312 can include a load sensor 328 to determine when the load (e.g., lamp load 308) is decoupled from the protection hardware circuit 312.

The load sensor 328 can be coupled to the power supply 326 to receive electrical power. As used herein, a load sensor 328 can be a device that measures the voltage, current, and/or frequency of electrical power provided to a load (e.g., lamp load 308. For example, the load sensor 328 can be utilized to determine when the load is coupled to the circuit and when the load is decoupled from the circuit. As described herein, a load that is removed from the circuit can cause an unwanted spike in voltage that can be dangerous to a user that is in contact with the circuit.

In addition, the load sensor 328 can be coupled to a relay coil 330 of the DPDT relay 324. As used herein, the relay coil 330 can be an electrically operated switch. For example, the relay coil 330 can use an electromagnet to mechanically operate a first switch 332-1 and a second switch 332-2 of the DPDT relay 324. In some examples, the load sensor 328 can instruct the relay coil 330 based on a voltage, current, and/or frequency monitored by the load sensor 328. In some examples, the load sensor 328 can monitor electrical power provided by the power supply 326 coupled to the isolation transformer 306 and/or monitor electrical power at a normally open (N/O) side of the first switch 332-1 and the N/O side of the second switch 332-2. That is, the protection hardware circuit 312 can include a double pole double throw (DPDT) relay 324 to change a DPDT pole from normally closed (N/C) to normally open (N/O) when an output of the isolation transformer 306 meets or exceeds the threshold voltage.

The first switch 332-1 and the second switch 332-2 can include a N/O side and a normally closed (N/C) side. In some examples, the first switch 332-1 and the second switch 332-2 can both be on the N/C side when the lamp load 308 is functioning and/or connected to the circuit. For example, the first switch 332-1 and the second switch 332-2 can both be in a N/C position (e.g., connection of the switch is coupled to the N/C side of the switch, etc.) when the system 320 is functioning normally. As used herein, the system 320 can be functioning normally when the system 320 is functioning to a manufacturer specification. As illustrated in FIG. 3, the lamp load 308 can be coupled to the isolation transformer 306 when the first switch 332-1 and the second switch 332-2 are in the N/C position.

As described herein, the lamp load 308 can be removed from the system 320 when the lamp load 308 is being replaced. As described herein, the lamp load 308 can be a hot swappable lamp load that can be removed while power is provided to the lamp load 308. In some examples, the system 320 can be utilized to detect when the lamp load 308 is removed from the circuit of the system 320. For example, the load sensor 328 can determine when a voltage output of the isolation transformer 306 meets or exceeds a threshold voltage (e.g., threshold voltage of 50 V, etc.). In this example, the load sensor 328 can send a signal to the relay coil 330 to change the state of the DPDT relay 324 from N/C to N/O, which can disconnect the output of the isolation transformer 306 from the lamp load 308. Thus, the switch 332-1 and the switch 332-2 can be in the N/O position when the lamp load 308 is removed from the system 320 or when the lamp load 308 is open. In this way, the protection hardware 312 can protect a user working on the lamp load 308 when the output of the isolation transformer 306 meets or exceeds the threshold voltage by disconnecting the output of the isolation transformer 306 from the lamp load 308 and/or other devices coupled to an output of the protection hardware 312. In some examples, an open circuit voltage (e.g., lamp load 308 is open, etc.) at the lamp load 308 is below 50 Root Mean Square (RMS) Alternating Current (AC) Volts (V).

In some examples, the protection hardware 312 can provide a circulating path for the load sensor 328 when the first switch 324-1 and the second switch 324-2 are in the N/O position. As described herein, the first switch 324-1 and the second switch 324-2 can be in the N/O position when the lamp load 308 is removed from the system 320. By providing the circulating path for the load sensor 328, the lamp load 308 can be a hot swappable lamp load that can be removed from the system 320 without causing damage to the system 320. As used herein, a circulating path includes an electrical pathway that bypasses a system or device. For example, the circulating path generated when the first switch 324-1 and the second switch 324-2 are in the N/O position can bypass the lamp load 308. That is, the protection hardware circuit 312 can be configured to utilize the circulating path when the load (e.g., lamp load 308, etc.) is a hot pluggable load (e.g., hot pluggable lamp load, etc.).

In some examples, the protection hardware 312 can provide the circulating path for the load sensor 328 for a particular period of time. For example, the protection hardware 312 can provide continuous load sensing at the load sensor 328 for a particular period of time. In this example, the load sensor 328 can be utilized to determine when the lamp load 308 has be coupled to the system 320 or replaced with a new lamp load in the system 320. When the load sensor 328 detects the presence of the lamp load 308, the load sensor 328 can provide a signal to the relay coil 330 to alter the position of the first switch 332-1 and the second switch 332-2 back to the N/C position.

As described herein, the system 320 can be utilized to provide protection to a user working on devices coupled to the protection hardware 312. In some examples, the system 320 can be part of a high voltage AC airfield lighting system. In these examples, the protection hardware 312 can provide protection to a user working on the lamp load 308 or lamp load system comprising the lamp load 308. For example, the protection hardware 312 can detect when there is a voltage spike at the output of the isolation transformer 306 and utilize the DPDT relay 324 to bypass the lamp load 308 and/or lamp load system.

Figure 4:
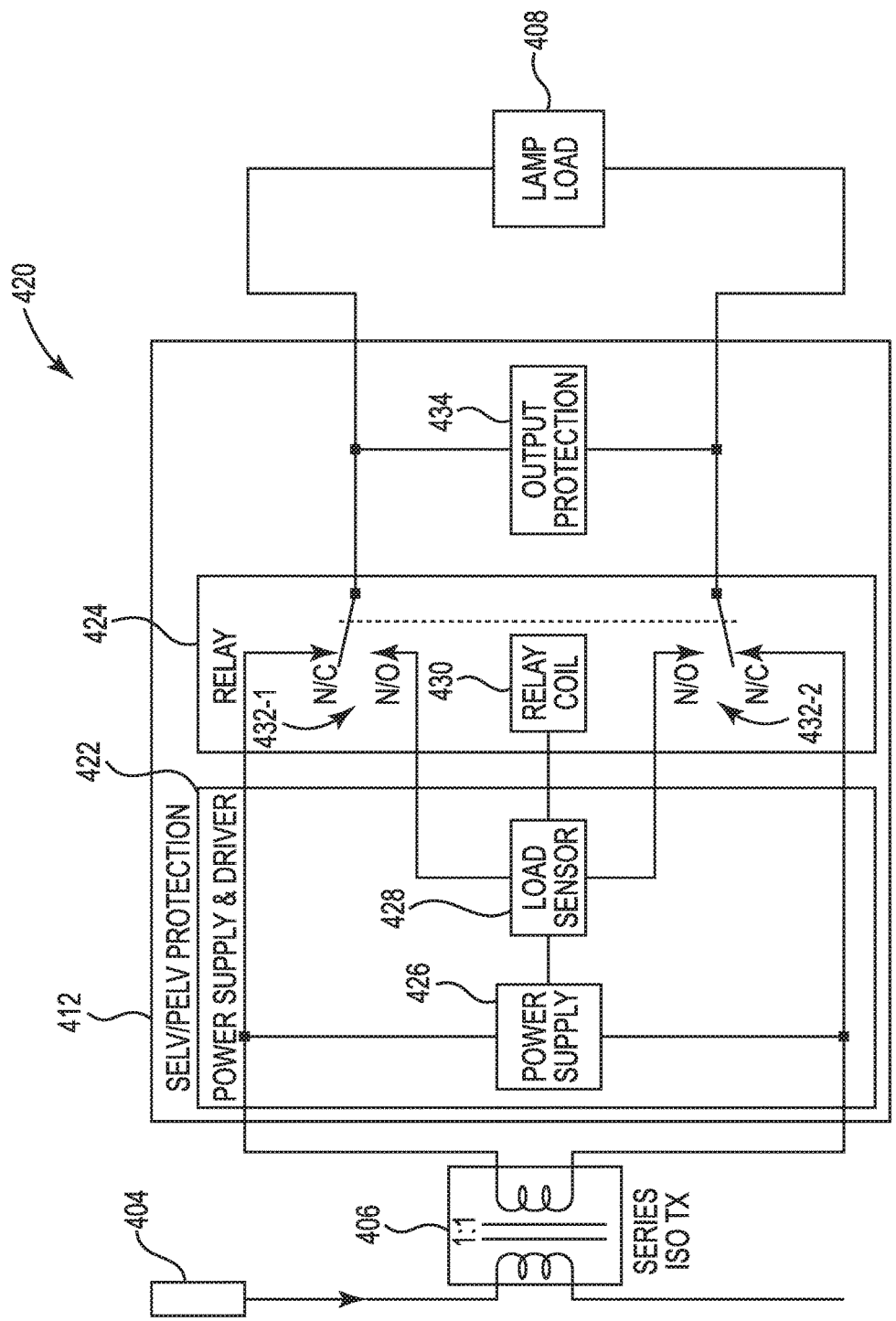
FIG. 4 is an example of a system for alternating current circuits for airfield lighting according to one or more embodiments of the present disclosure.

FIG. 4 is an example of a system 420 for alternating current circuits for airfield lighting according to one or more embodiments of the present disclosure. In some examples, the system 420 can be a part of a system 210 as referenced in FIG. 2. For example, the system 420 can include a CCR 404 coupled to an isolation transformer 406. In this example, the CCR 404 and the isolation transformer 406 can be similar to the CCR 204 and/or isolation transformer 206 as referenced in FIG. 2. In some examples, the isolation transformer 406 can be coupled to other isolation transformers in series. The system 420 can include the same or similar elements as the system 320 referenced in FIG. 3.

In some examples, the system 420 can include a lamp load 408. As described herein, the lamp load 408 can be an airfield light receiving electrical power from a power source coupled to the CCR 404 and/or the isolation transformer 406. The system 420 can include protection hardware 412 positioned between the isolation transformer 406 and the lamp load 408. As described herein, the protection hardware 412 can be a SELV protection hardware and/or a PELV protection hardware. In some examples, the protection hardware 412 can include a power supply/driver 422 and a double pole double throw (DPDT) relay 424.

The power supply 426 can be coupled to the isolation transformer 406. In some examples, the power supply 426 can convert electrical power from the isolation transformer 406 to electrical power suitable for a load sensor 428. For example, the power supply 426 can receive power from the isolation transformer 406 that includes a particular voltage, current, and/or frequency. In this example, the power supply 426 can alter the voltage, current, and/or frequency of the received power to a particular voltage, current, and/or frequency for the load sensor 428.

The load sensor 428 can be coupled to the power supply 426 to receive electrical power. As used herein, a load sensor 428 can be a device that measures the voltage, current, and/or frequency of electrical power provided to a load (e.g., lamp load 408, etc.). For example, the load sensor 428 can be utilized to determine when the load is coupled to the circuit and when the load is decoupled from the circuit. As described herein, a load that is removed from the circuit can cause an unwanted spike in voltage that can be dangerous to a user that is in contact with the circuit.

In addition, the load sensor 428 can be coupled to a relay coil 430 of the DPDT relay 424. As used herein, the relay coil 430 can be an electrically operated switch. For example, the relay coil 430 can use an electromagnet to mechanically operate a first switch 432-1 and a second switch 432-2 of the DPDT relay 424. In some examples, the load sensor 428 can instruct the relay coil 430 based on a voltage, current, and/or frequency monitored by the load sensor 428.

The system 420 can include output protection 434 coupled to an output of switch 432-1 and to an input of switch 432-1. In some examples, the output protection 434 can be coupled to the relay coil 430. In some examples, the output protection 434 can determine an output voltage from switch 432-1 and/or the input voltage of switch 432-2. In some examples, the output protection 434 can be a load sensor similar to load sensor 428. In some examples, the output protection 434 can determine when the voltage from the first switch 432-1 and/or the second switch 432-2 meets or exceeds a threshold voltage. As described herein, the threshold voltage can be a voltage that can be dangerous or harmful to a human user. In some examples, the output protection 434 can provide a signal to the relay coil 430 to alter a position of the first switch 432-1 and the second switch 432-1 from a N/C position to a N/O position as described herein when the output protection 434 determines the voltage meets or exceeds a threshold.

As described herein, the system 420 can be utilized to provide protection to a user working on devices coupled to the protection hardware 412. In some examples, the system 420 can be part of a high voltage AC airfield lighting system. In these examples, the protection hardware 412 can provide protection to a user working on the lamp load 408 or lamp load system comprising the lamp load 408. For example, the protection hardware 412 can detect when there is a voltage spike at the output of the isolation transformer 406 and utilize the DPDT relay 424 to bypass the lamp load 408 and/or lamp load system.

Figure 5:
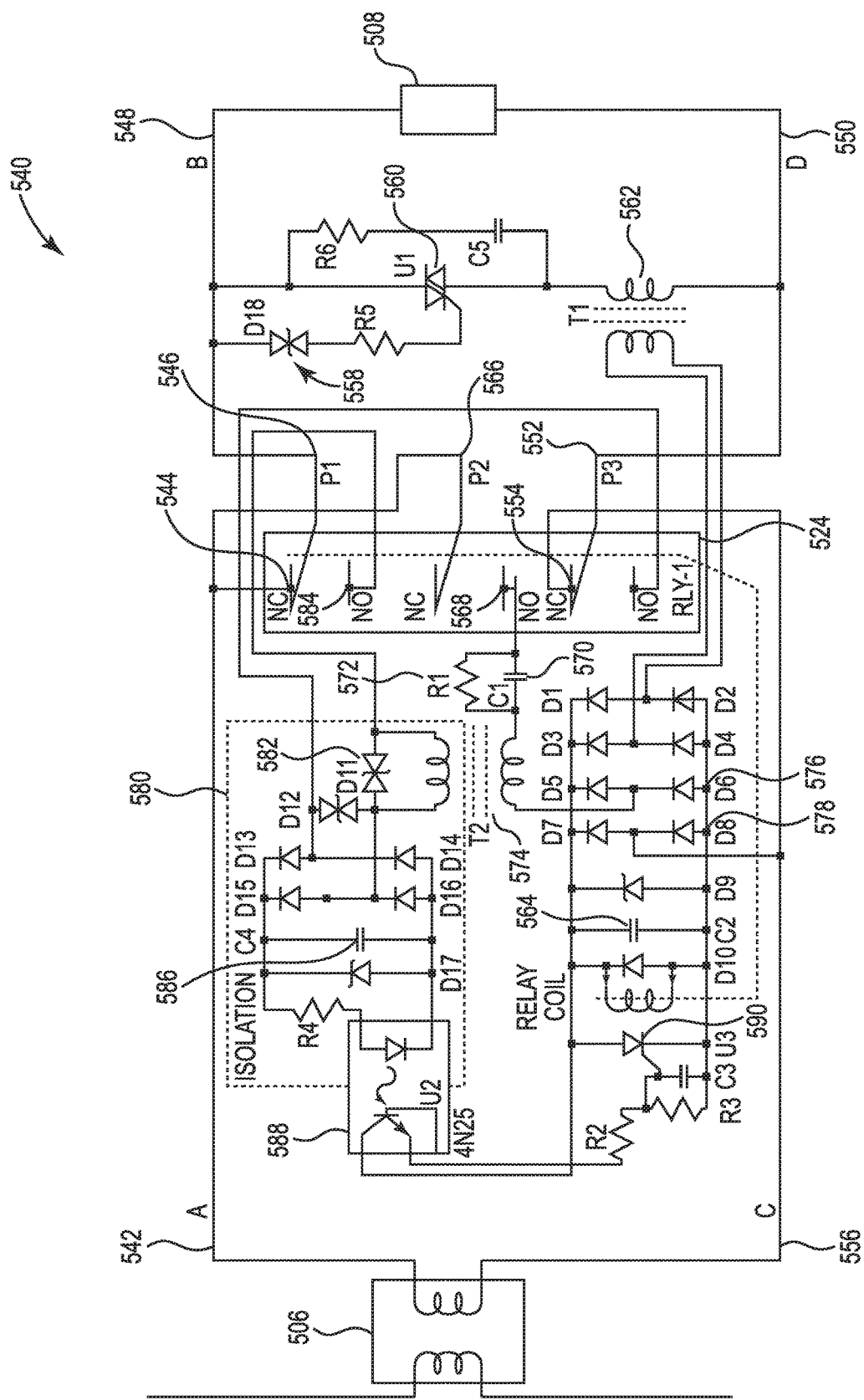
FIG. 5 is an example of a system for alternating current circuits for airfield lighting according to one or more embodiments of the present disclosure.

FIG. 5 is an example of a system 540 for alternating current circuits for airfield lighting according to one or more embodiments of the present disclosure. In some examples, FIG. 5 can illustrate a schematic between the series isolation transformer 506 and the lamp load 508. For example, the system 540 can illustrate a schematic version of system 320 as illustrated in FIG. 3 and/or system 420 as illustrated in FIG. 4. As described herein, the protection hardware can be provided between the series isolation transformer 506 and the lamp load 508.

In some examples, the system 540 can include an input (across point A 542 and point C 556 as illustrated on the left side of FIG. 5) and a lamp load 508 connected to an output (across point B and point D as illustrated on the right side of FIG. 5). In some examples, a circulating path of AC power can begin at point A 542 of the input, moves to a N/C 544, moves to pole P1 546 and moves to point B 548 at a first side of the lamp load 508. In these examples, the circulating path can return back starting at point D, moving to P3 552, moving to N/C 554, and ending at point C 556. For example, current can enter at point A 542, travel to N/C 544, travel to pole P1 546, and travel to point B 548. In this example, the return path for the current can enter at point D 550, travel to P3 552, travel to N/C 554, and travel to point C 556.

In some examples, the lamp load voltage across point B 548 and point D 550 can be disconnected when an increasing voltage at diode D18 558 meets or exceeds a threshold voltage (e.g., breakdown voltage, etc.) and triggers a clamping input U1 560 (across point A 542 and point C 556) going to lamp load 508. For example, current circulating in a path that starts at point A 542, moves to N/C 544, moves to pole P1 546, moves to clamping input U1 560, moves to transformer T1 562, moves to P3 552, moves to N/C 554, and ends at point C 556. In this example, the path can generate a secondary voltage at transformer T1 562 charging capacitor C2 564 which can enable a relay coil for RLY-1 524 with poles P1 546, P2 566, P3 552 changing its position from normally closed (NC) to normally open (NO) isolating the output across point B 548 and point D 550 from input across point A 542 and point C 556. In another example, an input across point A 542 and point C 556 can circulate current along a path that starts a point A 542, moves to pole P2 566, moves to N/O 568, moves to capacitor C1 570 and across resistor R1 572, moves to transistor T2 574, moves to diode D6 576, moves to capacitor C2 564, and moves to diode D8 578 maintaining capacitor voltage to hold relay RLY-1 524 in an enable state and isolating output completely. In another example, current flowing in transistor T2 574 can generate isolated extra low AC voltage (e.g., less than 5V) at secondary isolation 580 and is clamped by diode D11 582.

In some examples, the lamp load 508 can be connected back across point B 548 and point D 550. In these examples, the voltage across diode D11 582 can complete its path with RLY-1 524, to N/O 584, to pole P1 546, to pole P3 552, and charging capacitor C4 586. In these examples, the system 540 can enable Opto-coupler U2 output transistor 588 to trigger the gate of silicon controlled rectifier U3 590, which in turn can discharge capacitor C2 564 switching RLY-1 524 to a disabled state and connect the lamp load 508 to the input source across point A 542 and point C 556.

As used herein, "a" or "a number of" something can refer to one or more such things. For example, "a number of resources" can refer to one or more resources. Additionally, the designator "N", as used herein, particularly with respect to reference numerals in the drawings, indicates that a number of the particular feature so designated can be included with a number of embodiments of the present disclosure.

As described herein, a "module" can include computer readable instructions that can be executed by a processing resource to perform a particular function. A module can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processing resource.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above elements and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for alternating current circuits for airfield lighting, comprising:
   a circuit comprising an isolation transformer;
   a protection hardware circuit coupled to the isolation transformer, wherein the protection hardware circuit prevents a voltage between an electrical contact of the circuit and a ground contact from meeting or exceeding a threshold voltage, and wherein the protection hardware circuit includes a circulating path through a normally open (N/O) relay contact for load sensing logic, and wherein the protection hardware circuit includes a load sensor to determine when a load is decoupled from the protection hardware circuit; and
   the load coupled to the protection hardware circuit to receive electrical energy from the isolation transformer.

2. The system of claim 1, wherein the protection hardware circuit is configured to utilize the circulating path when the load is a hot pluggable load.

3. The system of claim 1, wherein the protection hardware circuit includes circuitry configured to change from closed to open when an output of the isolation transformer meets or exceeds the threshold voltage.

4. The system of claim 3, wherein the circuitry is configured to provide a circulating path for the load sensor when open.

5. The system of claim 1, wherein the protection hardware circuit includes a quadruple pole double throw (4PDT) relay to change a 4PDT pole from normally closed (N/C) to normally open (N/O) when an output of the isolation transformer meets or exceeds the threshold voltage.

6. The system of claim 1, wherein the load sensor is configured to measure a voltage, a current, and/or a frequency of electrical power provided to the load.

7. The system of claim 1, wherein the circuit is coupled to a current regulator configured to provide electrical energy to the isolation transformer.

8. The system of claim 1, wherein the isolation transformer and protection hardware are positioned within an enclosure configured to protect a connection between the isolation transformer and the protection hardware.

9. An alternating current protection device, comprising:
   an enclosure including an input electrically coupled to an airfield lighting circuit that includes an electrical power source, wherein the enclosure further includes:
   an isolation transformer to receive electrical energy via the input from the electrical power source; and
   a protection hardware circuit coupled between the isolation transformer and a load to receive electrical power from the electrical power source, wherein the protection hardware circuit is configured to prevent a voltage between an electrical contact of the airfield lighting circuit and a ground contact from meeting or exceeding a threshold voltage, and wherein the protection hardware circuit provides a circulating path through a normally open (N/O) relay contact for load sensing logic.

10. The device of claim 9, wherein the electrical power source is coupled to a constant current regulator (CCR).

11. The device of claim 9, wherein the electrical power source is a high voltage alternating current power source.

12. The device of claim 9, wherein the protection hardware circuit includes a triple pole double throw (3PDT) relay configured to disconnect the isolation transformer from the load when an output voltage of the isolation transformer meets or exceeds a threshold voltage.

13. The device of claim 9, wherein the protection hardware circuit includes a triple pole double throw (3PDT) relay configured to disconnect the isolation transformer from the load when the load is removed.

14. The device of claim 9, wherein the protection hardware provides a safety boarder line or a safety area between the protection hardware and the load.

15. A system for alternating current circuits for airfield lighting, comprising:
   a source regulator coupled to an electrical power source;
   a plurality of isolation transformers coupled in series with the source regulator;
   a plurality of protection hardware devices coupled to each of the plurality of isolation transformers, wherein each of the plurality of protection hardware devices provide a circulating path through a normally open (N/O) relay contact for load sensing logic; and
   a plurality of airfield lamps coupled to each of the plurality of protection hardware devices, wherein the plurality of airfield lamps are coupled to a corresponding triple double throw (3PDT) relay of a corresponding protection hardware device of the plurality of protection hardware devices.

16. The system of claim 15, wherein the plurality of protection hardware devices each include:
   a power supply coupled to a load sensor;
   a relay coil coupled to the load sensor; and
   the 3PDT relay coupled to the load sensor.

17. The system of claim 16, wherein the relay coil is an electrically operated switch configured to use an electromagnet to mechanically operate a first switch and a second switch of the 3PDT relay.

18. The system of claim 16, wherein the load sensor is configured to send a signal to the relay coil to change a state of the 3PDT relay from the normally closed (N/C) position to the normally open (N/O) position.

* * * * *